Patented Feb. 7, 1928.

1,658,078

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

PROCESS OF DESICCATION.

No Drawing.   Application filed August 2, 1922.   Serial No. 579,297.

The invention relates to a process for drying substances contained in solution and in slurries or pastes and which substances are of a nature more or less sensitive to high temperatures, for example fruit juices and food products, as milk, buttermilk and sugars, and other substances of low critical temperature characteristics. The production of these substances in dried (powdered) form is best accomplished by spraying same into a hot gas; but this operation must be conducted in such a manner that in a dry form the particles will not be subjected for any appreciable length of time to any such temperature as would cause alteration in their chemical constitution or cause loss of easily volatilized compounds. The spraying operation is, therefore, in accordance with the improved method, to be so conducted and controlled that the material neither before nor after drying is exposed more than momentarily to a temperature above its critical point to wit— the point at which caramelization occurs or melting thereof to cause the powder to go into mass condition. In this connection, it will be appreciated that, due to the fact that the evaporation period is only a fraction of a second in duration, the rapidity with which this evaporation occurs produces momentarily a refrigerating effect which is especially conducive to the maintenance of a temperature of the material below the danger point. It thus becomes possible to use gases at extremely high initial temperatures for the medium into which the substances are to be sprayed, temperatures even as high as 1000° F. in some instances not being objectionable.

It is particularly desirable, also, to dehydrate the drying gas prior to heating it and thus increase its moisture carrying capacity and make possible a lower final temperature thereof and which shall be below the critical point of the substance treated. Furthermore, with high initial temperatures, a secondary volume of dehydrated and heated gas may be introduced to further increase the moisture carrying capacity. Other influencing factors are more or less hygroscopic materials which are contained in or may be introduced into the solution of the substance to be dried; and these serve as a carrying vehicle for aromatic ethers and other volatile substances.

I am aware that it has been proposed to provide means for rapidly cooling the entire volume of the drying gas when the desiccation is completed, or just previous to its completion. The present invention does not contemplate, however, such mass cooling of the gas as it is essential only that the desiccated product be cooled upon completion of the desiccation or immediately before or after same. To this end, the material is carried in suspension until thoroughly desiccated; and for this purpose, it may be necessary to maintain the final temperature of the drying gas above the critical temperature of the substance dried. The latter however, must then be promptly reduced in temperature, as by passing rapidly from the spent drying gas into a zone of cool gas, which latter in some instances may also possess dehydrating properties. The degree of dehydration of the drying gas will be determined by the character of the substances to be recovered from the solution, some being recoverable with greater facility than others.

Where it is possible to counteract to a very considerable extent the hygroscopic properties of such substances, or to counteract or mask the lower melting point constituents in such substances by the introduction of other materials, the extent of dehydration of the drying gas may be reduced. As set forth in Patent No. 1,562,309, relating to the drying of fruit juices, the pulp-forming cell structures thereof may be retained and serves not only to mask the low melting point characteristics and hygroscopic characteristics, but acts also as a carrying vehicle for the aromatic ethers thereof. In some instances, other substances as cane sugar or its equivalent may be added in the proper proportion.

I have found that it is possible, by properly balancing the heat content and poundage of gas to the evaporation of moisture to be done, to thereby bring the final temperature of the gas at the end of the drying operation below the critical point or the critical temperature condition of the substance being dried. For example, in the drying of orange or lemon juice the poundage of air required will be determined by the quantity to be dried, particularly the amount of water to be removed. If 100 gallons of this juice are to be dried, the weight of same will be approximately 860 lbs. of which the solid content constitutes 103 lbs., leaving 757 lbs.

of water to be evaporated. It has been found that with a drying atmosphere at 300° F. some 284 lbs. of air per pound of solid material or powder produced, are required, with a final resulting temperature of 110° F. and a moisture content low enough to prevent coalescing of the dry particles. When a carrying vehicle such as sugar is added initially to the extent of bringing the solid content up to say 20% instead of the normal 12% content, it has been found that a higher initial temperature may be given the gaseous drying medium, for example 360° F. Furthermore, considerably less poundage of gaseous drying medium will then be required, in the present example, only 108 lbs. per pound of powder as against the 284 lbs. of the previous example. Where it is necessary to maintain the final temperature of the drying gas above the critical temperature of the dried material, the product will have to be rapidly delivered, after having been desiccated, into a zone of gas at a temperature below its critical point.

Various forms of apparatus may be employed for this purpose; and I do not desire to be restricted to any particular form thereof nor mode of operation. For example, the drying gas and spray may be introduced together at one side of a drying chamber (not shown) of comparatively large volume so that the velocity of the dried gas is promptly dissipated as soon as the drying operation is completed, the product falling therefrom into a zone of cold gas; and I have further found it possible to maintain, in such systems, distinct layers of gas when there is a decided difference in temperature, the spent drying gas passing out at a point above the zone of cooler gas.

Or, the sprayed solution and the drying gaseous medium may be introduced at different points in the upper zone of a horizontal chamber, (not shown) so as to maintain a hot drying zone in the upper part and a cold cooling zone in the bottom.

Or, the sprayed material and the hot drying medium may be introduced together at the top of a vertical drying chamber (not shown) and a cold cooling zone maintained in the lower part.

I claim:—

The process of preparing a dry powder from fruit juices, and the like, which contain volatile aromatic principles and are sensitive to the effects of elevated temperatures which consists in incorporating sucrose therewith, subjecting the mixture in minute liquid particles to a preliminarily heated drying gas initially at the highest temperature thereof, said temperature being in excess of the critical temperature of the particular substance, and maintaining the heat content and poundage of said gas with reference to the amount of substance desiccated such that the temperature of the latter substantially at completion of the desiccating action and while the product is still in suspension will not be in excess substantially of its said critical temperature and the humidity condition thereof such as to prevent the dried particles from coalescing.

Signed at New York, in the county of New York and State of New York, this 31st day of July A. D. 1922.

WALTER H. DICKERSON.